United States Patent [19]

Laney, Sr.

[11] 4,037,488

[45] July 26, 1977

[54] HANDLE MECHANISM FOR MACHINE TOOLS

[76] Inventor: Thomas D. Laney, Sr., 6026 SE. Brooklyn St., Portland, Oreg. 97206

[21] Appl. No.: 660,272

[22] Filed: Feb. 23, 1976

[51] Int. Cl.$^2$ .................. G05G 1/12; F16D 11/00
[52] U.S. Cl. .................. 74/548; 74/527; 74/528; 74/545; 192/67 P; 403/93; 403/322
[58] Field of Search ............ 74/527, 528, 548, 545; 192/67 R, 67 P, 95; 403/322, 325, 93

[56] References Cited

U.S. PATENT DOCUMENTS

| 241,180 | 5/1881 | Barker | 192/67 R |
|---|---|---|---|
| 395,607 | 1/1889 | Bayles | 74/528 X |
| 1,610,069 | 12/1926 | Weber | 74/527 X |
| 2,009,536 | 7/1935 | Warg | 74/527 X |
| 2,339,666 | 1/1944 | Anderson | 74/527 |
| 2,677,967 | 5/1954 | Galbraith | 192/67 P X |
| 3,821,904 | 7/1974 | Fowler | 74/816 X |

FOREIGN PATENT DOCUMENTS

232 AD   1/1887   United Kingdom ................ 74/548

*Primary Examiner*—Allan D. Herrmann
*Attorney, Agent, or Firm*—Chernoff & Vilhauer

[57] ABSTRACT

A handle mechanism adapted for mounting on a manually rotatable shaft of a machine tool. A spring-biased index pin mounted in the handle mechanism is extensible and retractable by movement of an associated handle member to selectively engage and disengage an index plate fixedly attached to the shaft of the machine tool, thereby permitting the handle mechanism to be coupled to the shaft for manual rotation thereof and decoupled from the shaft for independent rotation thereabout. The index pin and its surrounding bias spring are retained within the handle mechanism by a single threaded fastener permitting their ready removal for replacement or repair.

7 Claims, 6 Drawing Figures

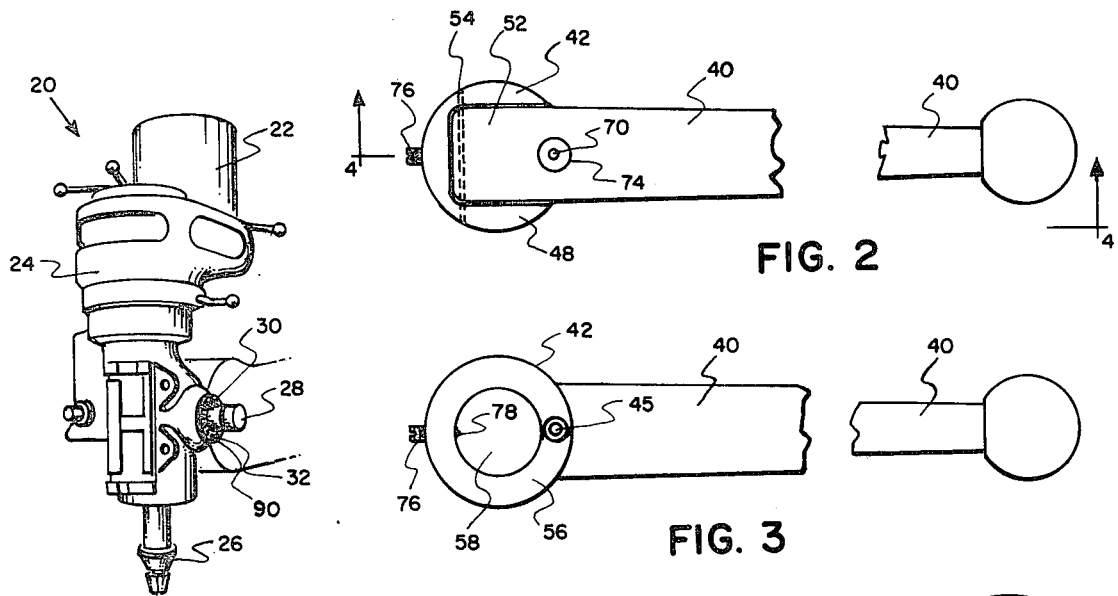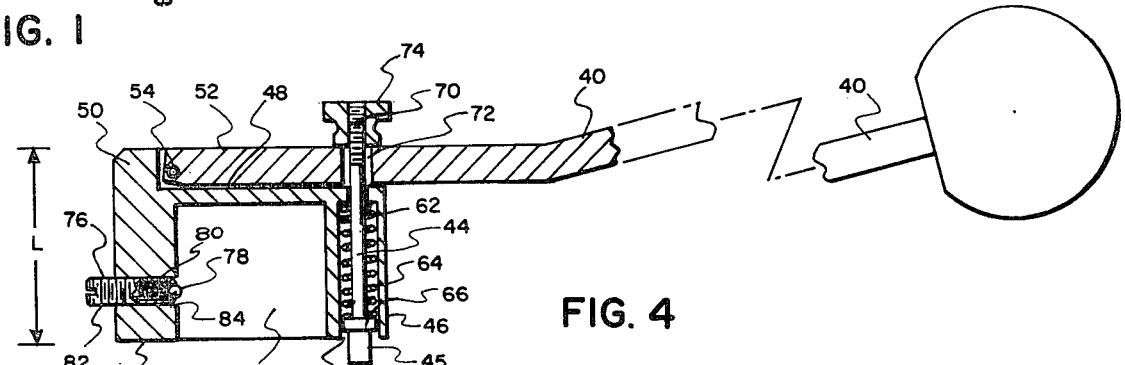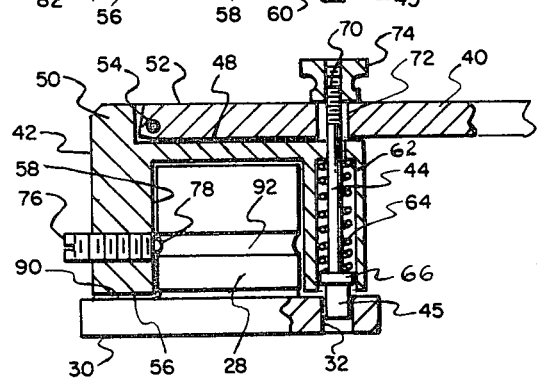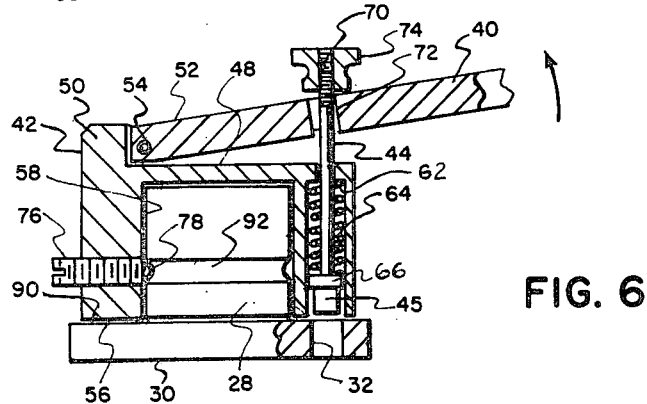

HANDLE MECHANISM FOR MACHINE TOOLS

Background of the Invention

The present invention relates to a handle mechanism adapted for use with a machine tool. Large machine tools, such as milling machines and vertical lathes, commonly include a manually rotatable shaft by which the tool operator may raise and lower a portion of the tool with respect to a work piece. To facilitate rotation of the shaft, various handle mechanisms have been developed that fit over the shaft and selectively engage an indexing plate attached thereto. An example of such a handle mechanism is disclosed in Fowler U.S. Pat. No. 3,821,904. Other examples are also known to the art. Common features of these known handle mechanisms includes a bore formed at least partway through a body member to facilitate mounting the mechanism on the shaft, and an index pin extensible from the body member for selective engagement with a plurality of apertures formed in the indexing plate. Movement of an associated handle member in one direction extends the index pin to fixedly couple the handle mechanism to the shaft such that rotation of the handle about the rotational axis of the shaft causes the shaft to rotate. Movement of the handle member in another direction retracts the index pin to decouple the mechanism from the shaft, thereby permitting the handle member to be rotated to a new position for re-engagement. In this manner, the handle mechanism may be repeatedly engaged and disengaged with the index plate, and thereby the shaft, to permit repeated small angular rotation of the handle to produce continued rotation of the shaft.

A principal disadvantage of known prior art handle mechanisms of the type described is that their indexing pins form an integral part of their mechanisms and cannot be removed without significant disassembly of the entire mechanism. Thus, if the pin is bent or otherwise damaged during use, the handle mechanism must be removed from the machine tool and almost completely disassembled, often a lengthy process requiring special tools, so that the index pin may be removed and replaced. During the time that the handle mechanism is being disassembled and the index pin is being replaced, the machine tool operator is without adequate means for operating his machine, with a consequent increase in down time and an attendant increase in cost of production.

Summary of the Invention

The present invention is directed to a handle mechanism adapted for mounting on and selective engagement with a rotatable shaft of a machine tool. More particularly, the handle mechanism of the present invention comprises a body member having a bore formed through its center to receive the shaft of the machine tool, an index pin slideably mounted in the body member for selective engagement with an indexing plate attached to the shaft, and a handle member hingedly attached to the rear of the body member for extending and retracting the index pin. A bias spring surrounds the index pin and is coupled between the body member and the pin to hold the pin in its full forward position with a portion of the pin protruding from the front of the body member. The rear portion of the index pin extends through an aperture formed in the handle member and is externally threaded to receive a knurled nut which serves both to couple the pin to the handle member and to retain the pin and its bias spring within the mechanism. Forward movement of the handle member permits the bias spring to move the pin forward while rearward movement of the handle member causes the pin to retract. The index pin and its bias spring may be removed from the mechanism simply by unscrewing the knurled nut from the threaded end of the pin.

The bias spring is located between the front of the body member and the handle member attached at its rear to permit the body member to have an extremely short length dimension. This exceptionally short length dimension of the body member is especially important when the handle mechanism is to be used in confined quarters, a condition present in many machine shops where a number of machine tools are closely spaced adjacent one another.

The placement of the indexing pin and its bias spring, and the manner in which the handle member is attached to the body member, also permits the entire mechanism to be of relatively simple, and therefore economical, construction. For example, the formation of the body member of the present invention requires the performance of only three major machining operations; the drilling of the central bore to receive the machine tool shaft, the drilling of a second smaller bore to house the indexing pin and bias spring, and the machining of a broad groove at the rear of the body member to receive the handle member. In contrast, other known handle mechanisms require the performance of a number of precise and complex machining operations.

A spring ball detent mounted in the body member and protruding into the bore formed therethrough is adjustable to engage an annular groove formed around the machine tool shaft to affix the handle mechanism to the shaft yet permit it to be rotated freely therearound. By using a spring biased ball as the detent, rather than for example a simple set screw, a secure affixture is achieved even on those shafts having annular grooves that are less than concentric with the axis of the shaft. A set screw detent, if tightened, too far, will cause the handle mechanism to bind as it is rotated about the shaft; if too loose, it will permit the mechanism to wobble. Both of these conditions are eliminated by the use of the spring ball detent.

It is, therefore, a principal objective of the present invention to provide a handle mechanism for machine tools including a selectively extensible indexing pin that may be readily removed for repair or replacement without requiring that the entire mechanism be substantially disassembled.

It is an additional objective of the present invention to provide a handle mechanism having an extremely short body member to permit the handle mechanism to be used in a confined space.

It is a further objective of the present invention to provide a handle mechanism that may be affixed to a rotatable shaft of a machine tool and rotated therearound without binding or wobbling.

The foregoing objectives, features and advantages of the present invention will be more readily understood upon consideration of the following detailed description of the invention taken in conjunction with the accompanying drawings.

Brief Description of the Drawings

FIG. 1 is a perspective view of a conventional machine tool.

FIG. 2 is a rear view of the handle mechanism of the present invention.

FIG. 3 is a front view of the handle mechanism of FIG. 2.

FIG. 4 is a sectional view of the handle mechanism of FIG. 2 taken along line 4—4.

FIG. 5 is a sectional view of the handle mechanism of FIG. 2 mounted on a rotatable shaft of a machine tool and with its index pin extended.

FIG. 6 is a sectional view of the handle mechanism of FIG. 2 mounted on a rotatable shaft of a machine tool and with its index pin retracted.

Detailed Description of the Invention

Referring to FIG. 1 of the drawings there is shown a portion of a conventional milling machine 20, comprising a motor 22 coupled to a drive mechanism 24 which in turn is coupled to a rotatable chuck 26 or other tool holding device that may be selectively raised and lowered with respect to the remainder of the tool by manual rotation of a laterally extending shaft 28 around which is fixedly attached an indexing plate 30 containing a plurality of apertures 32 formed therethrough in a concentric ring about the shaft. The handle mechanism of the present invention, shown in detail in FIGS. 2-4 is adapted for mounting on the shaft 28 of the machine tool 20 to facilitate the rotation of the shaft by the machine tool operator as described more fully below.

Referring now particularly to FIGS. 2-4, the handle mechanism of the present invention is seen to include an elongate handle member 40 hingedly attached to a body member 42 and coupled to an elongate spring-biased index pin 44, the forward end 45 of which extends a short distance beyond the front portion 46 of the body member. A broad groove 48 formed in the rear portion 50 of the body member 42 serves to house the base 52 of the handle member 40, and the actual attachment between the two members is provided by a roll pin 54 extending through both the body member and the handle member as shwon in the figures. A substantially planar face 56 constituting the front surface of the body member is perforated by a substantially cylindrical bore 58 extending through the face 56 and partway through the center of the body member 42. A second smaller bore 60 formed completely through the body member in a direction parallel to that of the bore 58 serves to house the index pin 44. The diameter of this second bore 60 is reduced slightly near the rear portion 50 of the body member 42 to form an annular ledge 62 serving to retain one end of a helical bias spring 64 surrounding the index pin 44 as shown in the figures. An annular flange 66 formed around the index pin 44 near its forward end 45 serves as a bearing surface to receive the force produced by the spring. By locating the bias spring 64 around and along the index pin 44, the length dimension of the body member 42, indicated by the arrow labeled L in FIG. 4, is kept at an absolute minimum, permitting the handle mechanism to be used in a confined space. The opposite end 70 of the index pin 44 extends through an aperture 72 formed in the handel member 40 and is threaded to receive a knurled nut 74 that serves both to couple the index pin to the handle member and retain the pin within the body member 42 such that rearward movement of the handle member 40 retracts the pin completely into the body member 42 and forward movement of the handle member permits the pin, under the force of the bias spring 64, to return to its initial position. Note that forward movement of the index pin 44 is restrained by the contact between the nut 74, while rearward movement of the pin is restrained only by the force of the bias spring 64. Lastly, a spring ball detent assembly 76 comprising a ball 78 and spring 80 in a threaded housing 82 is threaded into a bore 84 formed through one side of the body member 42 so as to protrude a short distance into the interior of the central bore 58.

To mount the handle mechanism of the present invention on a rotatable shaft 28 of a machine tool 20, the body member 42 is fitted over the shaft, as shown in FIG. 5, so that the shaft extends into the central bore 58 of the body member and the face 56 is in contact with the flat surface 90 of the indexing plate 30 surrounding the shaft. The spring ball detent assembly 76 is then adjusted until the ball 78 is securely seated in an annular groove 92 formed around the shaft 28 for that purpose. Note that the forward end 45 of the index pin 44, because of the force exerted against the index pin by the bias spring 64, protrudes beyond the face 56 of the body member 42 and into one of the apertures 32 formed in the indexing plate 30. As so mounted and adjusted, the handle mechanism is securely coupled to both the shaft 28 and the indexing plate 30 affixed thereto, and rotation of the handle member 40 about the axis of rotation of the shaft will cause a similar rotation of the shaft itself. Whenever it is desired to rotate the shaft an angular distance beyond that conveniently achieved by rotation of the handle member, the index pin 44 may be retracted from the indexing plate 30 and into the body member 42 by a rearward movement of the handle member 40, and the handle mechanism rotated freely about the shaft 28 until the index pin is proximate a second one of the apertures 32 formed in the indexing plate 30. The handle member 40 is than moved forward to insert the forward end 45 of the index pin 44 into the selected aperture 32 and recouple the handle mechanism to the shaft 28. Note that as the handle mechanism is rotated about the shaft 28 while decoupled from the indexing plate 30, the spring ball detent 76 will maintain a firm contact with the shaft 28, effectively absorbing any eccentricity in the annular grooves 92.

Also, the spring ball detent 76 permits the handle mechanism to be demounted from the shaft 28 at any time simply by pulling the body member 42 outwardly away from the machine tool 20 with the ball 78 snapping out of the groove 92 without requiring readjustment of the detent itself. Similarly, the handle mechanism may be remounted simply by pushing the body member 42 over the shaft until the ball 78 snaps back in place in the groove 92. By this means, once the spring ball detent 76 has been initially adjusted for a particular machine tool 20 the handle mechanism of the present invention may be repeatedly demounted and remounted without requiring that the detent be repeatedly readjusted.

A significant feature of the handle mechanism of the present invention is that, as the handle mechanism is being moved to a new position about the shaft 28, the handle member 40 may be moved to its full forward position as soon as the index pin has passed the aperture 32 nearest the selected aperture. This feature permits the machine tool operator to rotate the handle mechanism to an approximate new position and then move the handle member 40 forward, without regard to the precise locations of the apertures 32, while continuing to rotate the handle member in the desired direction. Upon moving the handle member forward, the index pin 44 will be forced against the flat surface 90 of the indexing plate 30 by the bias spring 64 so that upon reaching the selected aperture 32 the pin will be automatically inserted thereinto.

If, at any time during use, either the index pin 44 or the bias spring 64 becomes damaged or broken due to continued engagement and re-engagement of the pin with the apertures 32 of the indexing plate 30, they may be easily removed from the handle mechanism simply by unscrewing the knurled nut 68 from the rear end 64 of the pin and withdrawing both the pin and the spring from the body member 42. A new pin or spring may then be reinserted into the handle member, the nut 68 refastened to the pin, and the handle mechanism remounted on the machine tool simply by pushing the body member 42 back onto the shaft 28 until the detent ball 78 snaps back into place in the annular groove 92 formed around the shaft. In this manner, the handle mechanism may be placed back into operation almost immediately after the broken or damaged pin 44 or spring 64 is discovered.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A handle mechanism for machine tools comprising:
   a. a body member having a front portion and a rear portion, said front portion defining a substantially planar face, and means defining a bore extending through said face and into said body member;
   b. an elongate handle member hingedly attached to said rear portion of said body member and extending laterally therefrom;
   c. an elongate index pin slideably mounted in said body member parallel to the direction of said bore so as to be forwardly extensible beyond said face and rearwardly retractable behind said face; and
   d. fastening means removably positioned proximate a side of said handle member oriented away from said body member and attached to said index pin for coupling said pin directly to said handle member such that movement of said handle member in one direction relative to said body member causes said index pin to retract behind said face and movement of said handle member in an opposite direction relative to said body member causes said index pin to extend beyond said face, said retraction and extension of said index pin being effected solely by movement of said handle member, and for permitting said retraction and extension of said index pin independent of said movement of said handle member, said index pin being completely removable from said body member solely upon detachment of said fastening means.

2. The handle mechanism of claim 1 further comprising spring ball detent means mounted in said body member so as to protrude into said bore for adjustably engaging a shaft of said machine tool.

3. The handle mechanism of claim 1 further comprising bias means coupled between said index pin and said body member for producing a force tending to hold said pin in its forward extended position.

4. The handle mechanism of claim 3 wherein said handle member includes means defining an aperture formed therethrough and wherein the rear portion of said index pin extends through said aperture, said fastening means comprising a nut removably attached to said portion of said pin extending through said handle member such that forward movement of said pin is restrained by contact between said nut and said handle member, and rearward movement of said pin is restrained only by said bias means.

5. The handle mechanism of claim 3 wherein said bias means comprises a helical spring surrounding said index pin and positioned between said face of said body member and said handle member.

6. A handle mechanism for machine tools comprising:
   a. a substantially cylindrical body member having a front portion and a rear portion, each of said front and rear portions defining a respective substantially planar face, means defining a substantially cyclindrical bore formed through said front face and into said body member, and means defining a three-sided groove formed through said rear face and into said body member, said groove means having two mutually opposed side walls and an end wall perpendicular thereto;
   b. an elongate handle member having an end portion of size and shape corresponding substantially to that of said groove means of said body member, said handle member being hingedly attached to said rear portion of said body member such that said end portion of said handle member is housable wholly within said groove means, the remainder of said handle member extending from said body member in a direction substantially perpendicular to that of said bore;
   c. an elongate index pen slideably mounted in said body member so as to be extensible forwardly beyond said front face and retractable rearwardly behind said front face; and
   d. fastening means for coupling said handle member to said index pin such that movement of said handle member in one direction relative to said body member causes said pin to retract behind said front face and movement of said handle member in an opposite direction relative to said body member causes said pin to extend beyond said front face, said end portion of said handle member being housed wholly within said groove means of said body member whenever said handle member is moved so as to cause said extension of said index pin.

7. The handle mechanism of claim 6 wherein said index pin is retractable and extensible independent of said movement of said handle member.

* * * * *